(12) United States Patent
Trani (10) Patent No.: US 11,705,615 B2
(45) Date of Patent: Jul. 18, 2023

(54) FRICTIONLESS ACCESS CONTROL SYSTEM WITH CEILING TILE POSITIONING UNIT

(71) Applicant: Johnson Controls Tyco IP Holdings LLP, Milwaukee, WI (US)

(72) Inventor: James Trani, Albuquerque, NM (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 536 days.

(21) Appl. No.: 15/729,928

(22) Filed: Oct. 11, 2017

(65) Prior Publication Data

US 2018/0102583 A1 Apr. 12, 2018

Related U.S. Application Data

(60) Provisional application No. 62/406,728, filed on Oct. 11, 2016.

(51) Int. Cl.
| | |
|---|---|
| *H01Q 1/00* | (2006.01) |
| *H01Q 1/44* | (2006.01) |
| *H01Q 1/22* | (2006.01) |
| *H01Q 21/20* | (2006.01) |
| *G06K 7/10* | (2006.01) |
| *H01Q 21/06* | (2006.01) |
| *G07C 9/28* | (2020.01) |
| *G07C 9/27* | (2020.01) |
| *H04W 4/33* | (2018.01) |

(Continued)

(52) U.S. Cl.
CPC ....... *H01Q 1/1214* (2013.01); *G06K 7/10356* (2013.01); *G07C 9/27* (2020.01); *G07C 9/28* (2020.01); *H01Q 1/007* (2013.01); *H01Q 1/2216* (2013.01); *H01Q 1/44* (2013.01); *H01Q 21/065* (2013.01); *H01Q 21/205* (2013.01); *H04W 4/33* (2018.02); *G07C 9/00* (2013.01)

(58) Field of Classification Search
CPC ........ H01Q 21/065; H01Q 1/42; H01Q 1/007; H01Q 1/1214; E04D 12/002; G06K 7/10356
See application file for complete search history.

(56) References Cited

U.S. PATENT DOCUMENTS

| | | | |
|---|---|---|---|
| 6,268,882 B1 * | 7/2001 | Elberbaum | G08B 13/19619 348/143 |
| 6,715,246 B1 * | 4/2004 | Frecska | H01Q 1/1207 52/27 |

(Continued)

*Primary Examiner* — Ricardo I Magallanes
(74) *Attorney, Agent, or Firm* — ArentFox Schiff LLP (57) ABSTRACT

A positioning unit of an access control and user tracking system includes an antenna, which is embedded in the substrate of a ceiling tile of a drop ceiling system. The antenna can be observable (embedded in the substrate of an exposed surface of the ceiling tile), or, alternately, not observable (concealed within the substrate of the ceiling tile). A pinhole camera for capturing video information is inserted through the substrate of the ceiling tile and protrudes from the exposed surface of the tile. A ground plane covers the unexposed surface of the ceiling tile. A control module, comprising a controller, a network interface, an antenna controller, a power supply, an omni directional antenna and/or memory for the positioning unit, is positioned on the unexposed surface of the tile.

17 Claims, 4 Drawing Sheets

(51) Int. Cl.
*G07C 9/00* (2020.01)
*H01Q 1/12* (2006.01)

(56) References Cited

U.S. PATENT DOCUMENTS

| | | | | |
|---|---|---|---|---|
| 2008/0252546 | A1* | 10/2008 | Mohamadi | H03F 1/223 |
| | | | | 343/853 |
| 2014/0062728 | A1* | 3/2014 | Soto | G01S 7/415 |
| | | | | 340/937 |
| 2015/0035705 | A1* | 2/2015 | Anolik | H05K 7/20009 |
| | | | | 343/702 |
| 2016/0055692 | A1* | 2/2016 | Trani | G07C 9/20 |
| | | | | 340/5.61 |
| 2017/0324167 | A1* | 11/2017 | Ng | H01Q 5/371 |
| 2020/0018817 | A1* | 1/2020 | Karani | G01S 3/38 |

* cited by examiner

FRICTIONLESS ACCESS CONTROL SYSTEM WITH CEILING TILE POSITIONING UNIT

RELATED APPLICATIONS

This application claims the benefit under 35 USC 119(e) of U.S. Provisional Application No. 62/406,728, filed on Oct. 11, 2016, which is incorporated herein by reference in its entirety.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control readers, video surveillance cameras, network video recorders (NVRs), and door controllers, to list a few examples.

The access control readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards or bringing contactless smart cards within range (approximately 2-3 inches or 5 centimeters) of a reader. The access control readers read the information of the keycards and then the access control systems determine if the individuals are authorized to access the restricted areas. If the individuals are authorized to enter the restricted areas, then the access control readers allow access to the restricted areas by unlocking locked doors, signaling that doors should be unlocked, activating elevators, or generating alarms upon unauthorized entry, for example.

More recently, frictionless access control and tracking systems have been proposed. These systems use wireless technology that enables a more transparent method for identifying and tracking individuals while providing similar access control as traditional systems and methods. The systems can automatically identify individuals as they approach or stand in threshold areas of the access points. Threshold areas are typically areas within close proximity to the access points, such as entrances of the restricted areas and/or areas in front of doors, in examples. These systems accomplish these tasks without requiring the individuals to swipe or wave keycards, for example, at card readers, and can more continuously track those users in and around buildings.

In these systems, users carry active wireless devices on their person. These user devices transmit user information, such as credentials, that identify the users to a wireless receiving device, or positioning unit. In some cases, the user devices are mobile computing devices such as smart phones or tablet computing devices. In other cases, dedicated fobs are used.

In one implementation, the positioning units are installed at access points. The positioning units include directional antennas for detecting if a user with a user device is in close proximity to the access point. The positioning units might also include an omni directional antenna for communicating with user devices in the broader vicinity to the access point. When user information is received by the positioning units, the positioning units can then determine locations of the user devices (and thus the locations of the users) by using various positioning techniques of the antennas.

SUMMARY OF THE INVENTION

One problem with access control systems is the conspicuousness of the positioning units. This characteristic is largely determined by the directional antenna. In some systems, a rather large, horn antenna design is used. This antenna is cantilevered from the wall, above the door or access point.

The present invention includes a positioning unit that is designed into a standard ceiling tile format. The positioning unit includes an omni directional and directional antenna, as in previous systems. However, in the present invention, the directional antenna is a patch array antenna embedded in a ceiling tile insert. In one embodiment, a control module that directs the function of the positioning unit connects to the patch array antenna via an antenna feed line. The control module also allows connectivity with the rest of the access control system such as the verification and tracking system. A pinhole camera connected to the control module can be embedded or inserted into the ceiling tile insert such that it protrudes from the exposed bottom surface, enabling video capture for video analytic functions such as facial and body dimension recognition, gesture recognition and control, and tailgate prevention, among other examples.

In general, according to one aspect, the invention features a positioning unit of an access control and user tracking system for a security system. The positioning unit includes an antenna, which is installed in a drop ceiling system, for detecting wireless signals transmitted by user devices.

In embodiments, the antenna is a patch array antenna and is embedded in substrate of a ceiling tile of the drop ceiling system. The antenna can be observable (for example embedded in the substrate of an exposed surface of the ceiling tile), or, alternately, the antenna can be not observable (for example concealed within the substrate of the ceiling tile). A pinhole camera for capturing video information is inserted through the substrate of the ceiling tile and protrudes from the exposed surface of the tile. A ground plane covers the unexposed surface of the ceiling tile. A control module, comprising a controller, a network interface, an antenna controller, a power supply, an omni directional antenna and/or memory for the positioning unit, is positioned on the unexposed surface of the tile.

In general, according to another aspect, the invention features an access control and user tracking system for a security system. The access control and user tracking system includes positioning units for receiving packet data from user devices and generating location data for the user devices. The positioning units further comprise antennas for detecting wireless signals transmitted by the user devices, and the antennas are installed in drop ceiling systems.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
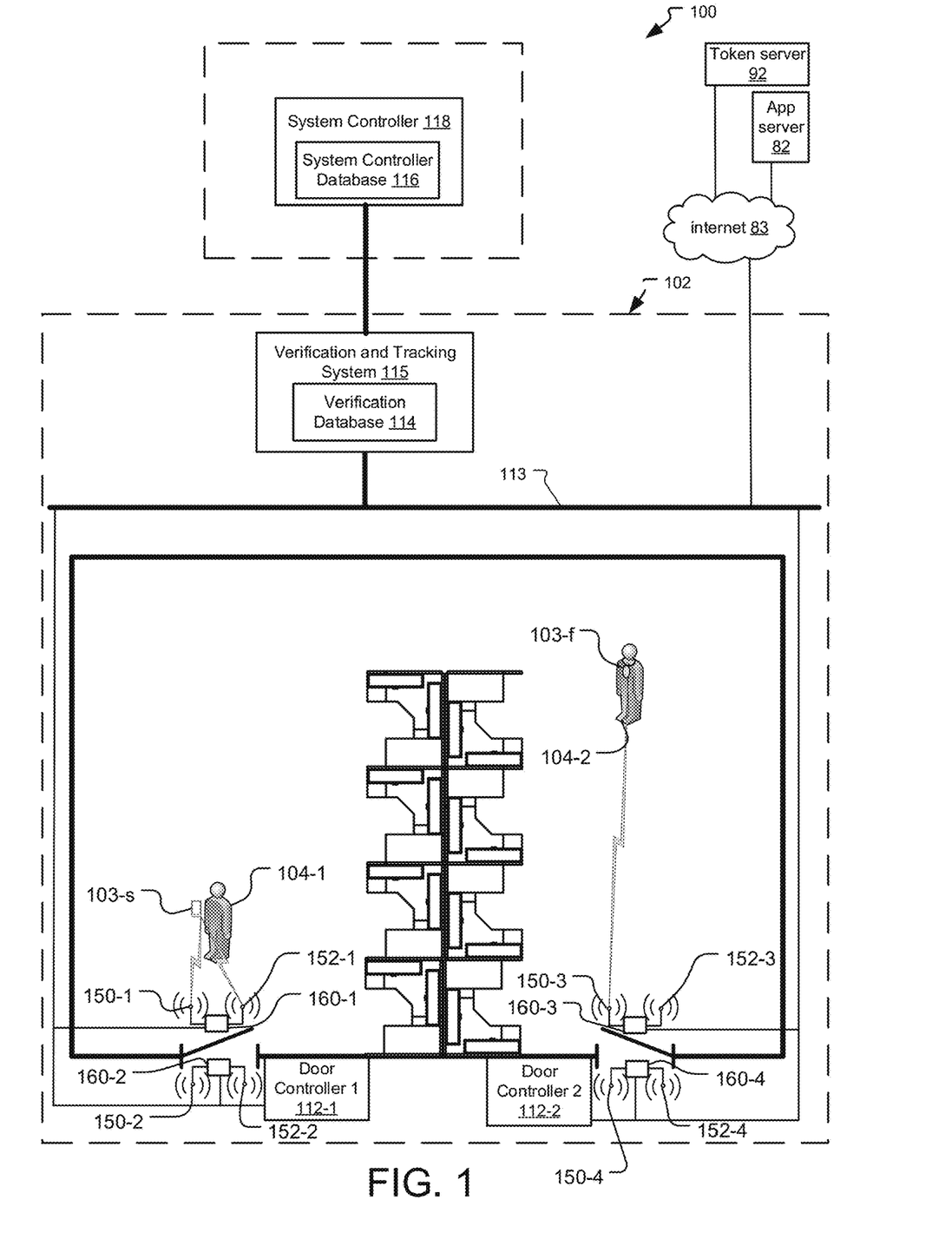
FIG. 1 is a schematic diagram of an exemplary access control system to which the current invention is directed.

FIG. 1 is a schematic diagram of an exemplary access control system 100, which has been constructed according to the principles of the present invention.

In operation, the access control system 100 identifies and tracks users 104, determines the locations of users' devices 103 such as smart phones 103-s or ancillary mobile computing devices 103-f such as fobs, and enables access through access points to possibly restricted areas of a premises such as a building 102.

In general, the system 100 also includes a verification and tracking system 115, positioning units 160, and may further include additional components such as a fingerprint reader kiosk, display devices, and door controllers 112. These components communicate with one another over an enterprise data network 113.

In more detail, in the illustrated example, positioning units 160 are located near access points, such as doors, of the building 102 or areas within the buildings such as door access points that enable users 104 to physically enter or exit the building 102 or access different parts of the building.

In a typical implementation, the users 104 carry their user devices 103, which broadcast packet data. The packet data includes device information for identifying the user device. In one example, the device information for each user device might be a media access control (MAC) address and/or internet protocol (IP) address that has been assigned to the user device or a communication port of the user device. The packet data also typically includes user information for identifying the users. The user information can include a unique user ID for each of the user and/or other information for identifying the user such as a username/password, name of user, department, work extension, personal phone numbers, email addresses, and employee ID number, in examples. In one example, the user information includes a token or a hash of the token generated for the user 104, and the token may or may not expire after a predetermined time.

Users carrying the user devices 103 enroll and/or register the user devices 103 with the system controller 118. When the user device is a smart phone or other mobile computing device, 103-s, the users 104 download a security app, in one example, from the app server 82 to their user device 103-s, where the security app provides access to the system controller 118.

When enrolling a smart phone user device 103-s with a token as the user information, the smart phone user devices 103-s and the system controller 118 might first access a token server 92 to request the token. In response, the token server 92 generates a token, and sends the token or a hash of the token to both the system controller 118 and the user device 103 in response. The token is then included as the user ID within the user information for the user, for both the user information maintained for the user in the system controller 118 and the user information included within the user device 103.

The wireless packet data broadcast from the user devices 103 is preferably secured to prevent unauthorized third parties from intercepting and decoding the packet data during transmission (i.e. during broadcasts). In one example, the packet data is encrypted. In a preferred embodiment, the user devices 103 broadcast the packet data using BLE (Bluetooth low energy) technology.

Bluetooth is a wireless technology that operates in a 2.4 GHz (gigahertz) short-range radio frequency band. In free space, Bluetooth applications typically locate a Bluetooth device by calculating the distance of the user devices 103 from the signal receivers. The distance of the device from the receiver is closely related to the strength of the signal received from the device. A lower power version of standard Bluetooth called Bluetooth Low Energy (BLE), in contrast, consumes between ½ and ¹⁄₁₀₀ the power of classic Bluetooth. BLE is optimized for devices requiring maximum battery life, as compared to the emphasis upon higher data transfer rates associated with classic Bluetooth. BLE has a typical broadcast range of about 100-150 feet (approximately 35-46 meters).

When transmitting via BLE, the user devices 103 might send an AltBeacon compliant BLE broadcast message every second. If the user devices 103 utilize tokens as the user ID, the user devices 103 preferably include a hash representation of the token/user ID in the BLE broadcast messages. In one implementation, the hash representation of the token is a 16-byte, one-way hash of the token, computed using the phone number of the user device 103-s as the seed key and possibly the current time.

In an alternative implementation, the user devices 103 are capable of broadcasting via standard Bluetooth. In still other alternative implementations, the user devices 103 may broadcast via other wireless technologies such as Wi-Fi (IEEE 802.11), active RFID (radio frequency identification), or ZigBee, to list a few examples.

The positioning units 160 each preferably include an omni directional antenna 150 and a directional antenna 152. The packet data are received by antennas 150, 152 of one or more positioning units 160, which determine range and/or direction of the users 104 using one or more positioning techniques.

Positioning units 160 receive the user information for each user and send the user information and the calculated location data to the verification and tracking system 115 via a data network 113. When the user devices 103 utilize tokens, the positioning units 160 might validate the tokens by comparing their own hash representations of the tokens to the representations included in the packet data. The positioning units 160 use the phone number of the user devices 103 or other reference as the seed key for this purpose in some examples. The location data are used by the verification and tracking system 115 to determine motion vectors for and to predict motion intent of the users 104, in examples.

Typically, the data network 113 is an enterprise network such as a Local Area Network (LAN), e.g., wired and/or wireless Ethernet. The positioning units 160 can also communicate with the verification and tracking system 115 via serial connections, in another example.

The verification and tracking system 115 accesses authorization information in a verification database 114, which it maintains or which it only accesses, to determine which users 104 are authorized to access specified restricted areas of a building 102 and/or pass through an access point. Once the users 104 are authenticated by the verification and tracking system 115 and it is determined that those users are authorized to transit the access point, the verification and tracking system 115 sends a door control signal via the network 113 to the door controller 112, in one example. The door controller 112 then enables access to a restricted area by unlocking an access point of the restricted area, such as a door or other portal, thereby providing access for the authorized user 104 to the restricted area while also possibly generating an alarm for an unauthorized user. The door controller 112 preferably unlocks the door when the authorized user 104 is within a threshold area near the access point (e.g., the door or other portal) of the restricted area.

In a typical implementation, the system 100 includes the system controller 118, which includes a system controller database 116. In general, the system controller 118 might store user information for each of the users 104 to the system controller database 116. The system controller database 116 also stores the authorization information 46 for the users 104 (e.g., which users 104 are permitted to access which restricted areas). Periodically, the system controller 118 sends updated user information and authorization information to the verification and tracking system 115 via the network 113. In response, the verification and tracking system 115 saves the received user information and authorization information to its verification database 114.

The verification and tracking system 115 accesses the user information and authorization information within its verification database 114, which acts as a local copy or "cache" of the information. To manage the temporal relevance of the entries in its verification database 114, the verification and tracking system 115 maintains a current time, and applies a time stamp to each item of user information and authorization information received from the system controller 118.

In the illustrated example, two positioning units 162 are installed on either side of each door. One user 104-1 carries a smart phone 103-$s$ that broadcasts user information to the positioning unit 160-1. Another user 104-2 carries a fob 103-$f$ that broadcasts user information to a different positioning unit 160-3.

Figure 2:
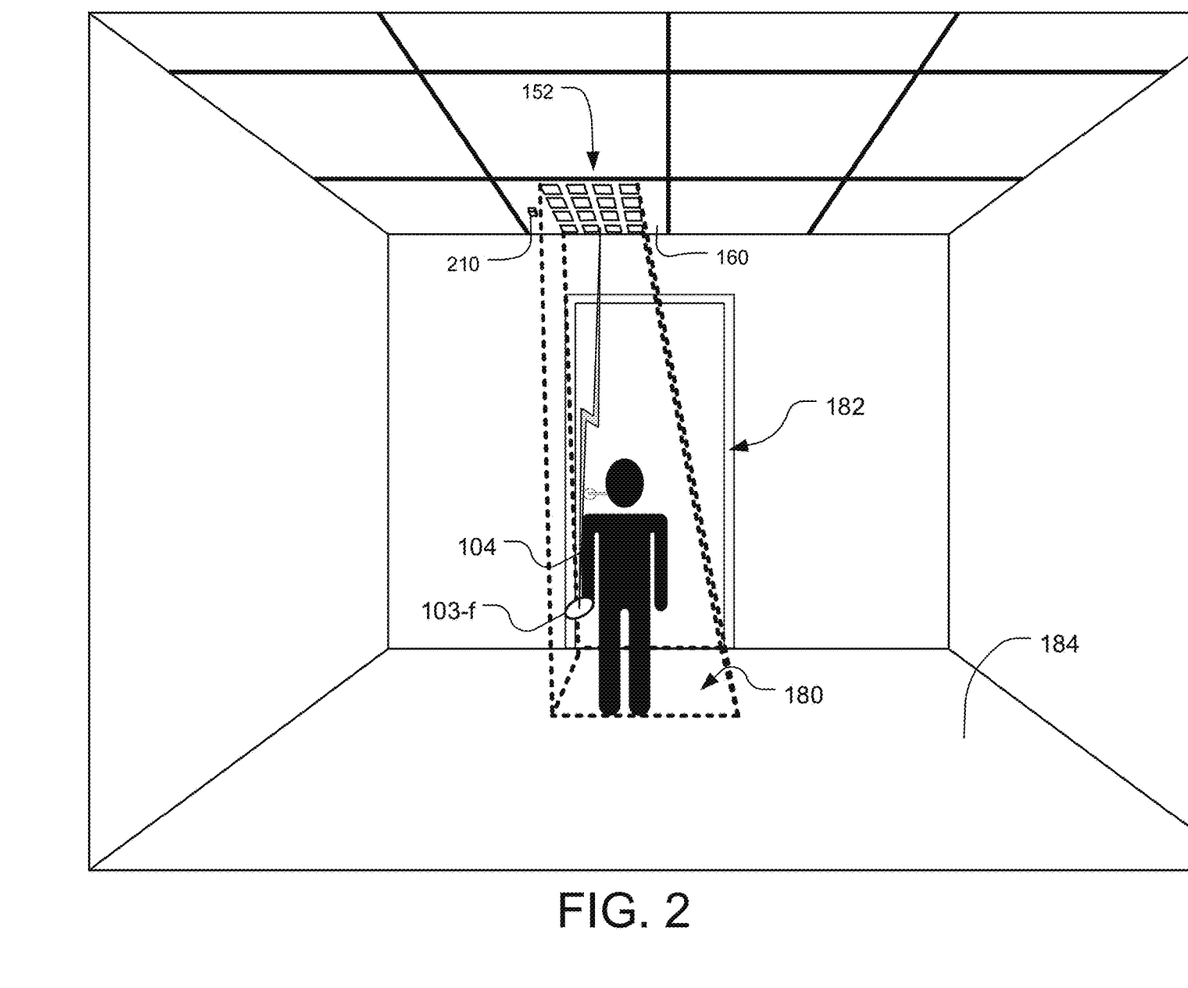
FIG. 2 is a perspective drawing of an access point with a ceiling tile positioning unit installed above the door in place of a normal ceiling tile, according to the present invention.

FIG. 2 is a perspective drawing of an access point with a ceiling tile positioning unit 160 installed above the door in place of a normal ceiling tile, according to the present invention.

Illustrated are the directional antenna 152, which detects whether a user with a user device is present in a region in front of the door, and a pinhole camera 210, which captures video information for video analytic functions such as facial and body dimension recognition, gesture recognition and control, and tailgate prevention, among other examples. In the illustrated example, a user 104 with a fob 103-$f$ that is broadcasting user information to the positioning unit 160 is located in proximity to the access point and the positioning unit 160. The dotted line shows the gain pattern of the directional antenna and how that gain pattern is coextensive with the threshold 180 of the access point 182 at the level of the floor 184 and the volumetric region above the threshold 180 of the access point.

Figure 3:
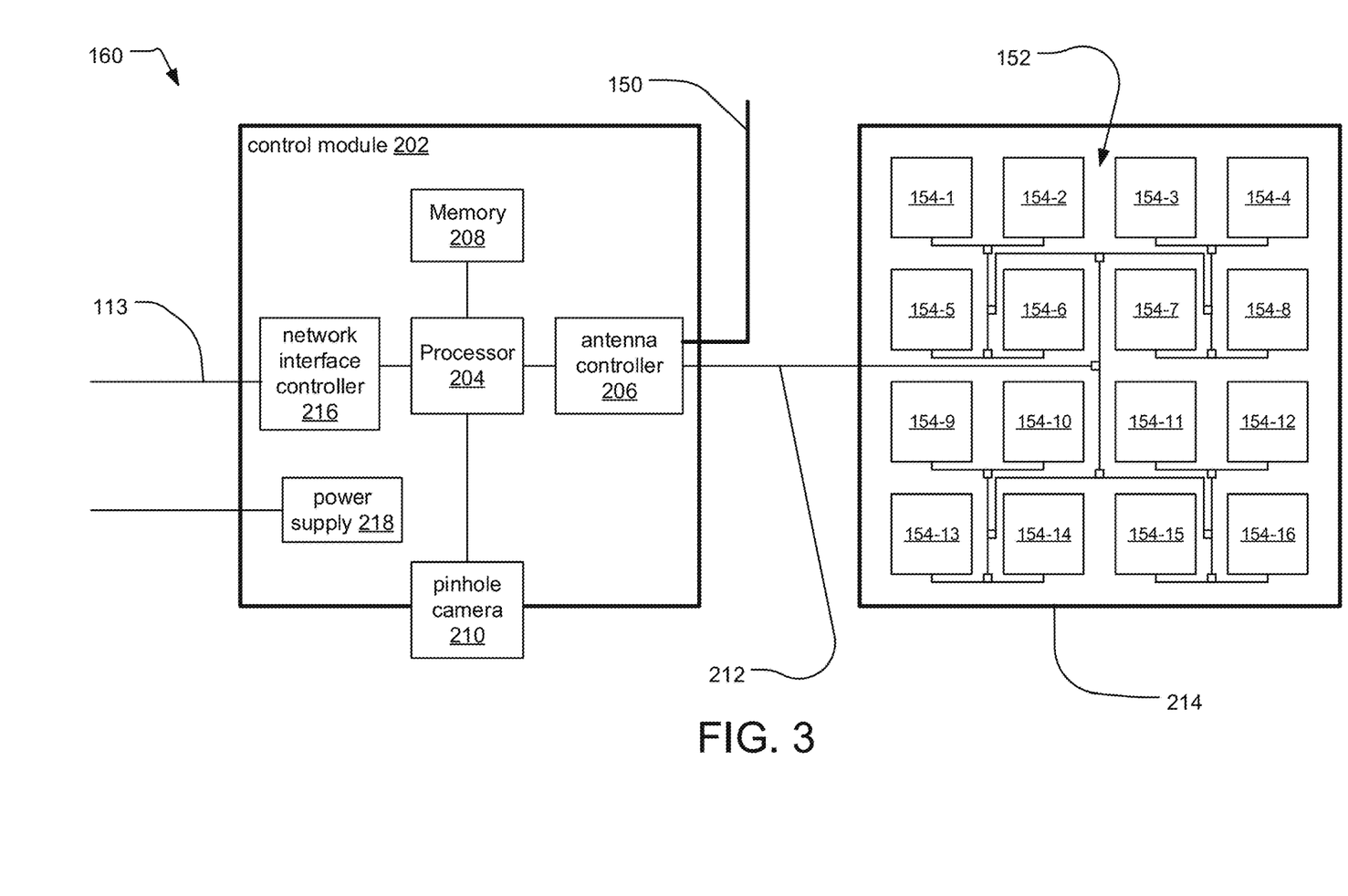
FIG. 3 is a schematic diagram illustrating a preferred embodiment of the positioning unit.

FIG. 3 is a schematic diagram illustrating a preferred embodiment of the positioning unit 160. The positioning unit 160 includes a control module 202 and a ceiling tile 214. The control module includes a network interface controller 218, a processor 204, an antenna controller 206, a power supply 218, memory 208, and the pinhole camera 210.

The controller 204 drives the function of the positioning unit 160, including sending and receiving user information to the verification and tracking system 115 via the network interface controller 216, which provides an interface with the network 113. The power supply 218 receives power from an external power source.

The antenna controller 206 connects to an omni directional antenna 150 and to a directional antenna 152. The directional antenna 152 is a patch array antenna that is embedded in the ceiling tile 214 and connects to the antenna controller 206 via a patch array feed line 212. In the illustrated example, the patch array antenna includes a 4×4 array of patch elements 154-1 to 154-16. A branching feedline network connects the patch elements 154 to the feedline 212. The propagation delay in the feedline network is tuned to create the desired gain pattern.

The antennas 150, 152 are used to determine the location of user devices 103. The patch antenna array comprise a series of patches connected by delay lines that control the phase relationship of the detected RF signals in order to create a directional antenna gain pattern.

Preferably, Bluetooth Low Energy (BLE) is the wireless technology used for communications between the user devices 103 and the positioning unit 160.

Typically, the directional antenna 152 establishes the close proximity of a user 104 to an access point such as a door, and the omnidirectional BLE antenna 150 allows the system 100 to continuously monitor (e.g. track) the locations of the users 104. In one implementation, the directional antenna can receive BLE broadcasts from user devices 103 located typically within a 3 foot by 3 foot region or threshold area in front of an access point as defined by the antenna's gain pattern. The access point, in turn, enables access to a restricted area of a building 102. In contrast, the omnidirectional antenna 150 can receive BLE broadcasts sent from user devices 103 in all locations/directions. Typically, the omnidirectional antenna 150 can receive BLE broadcasts sent from user devices 103 located beyond the threshold area but that are also still within the signal range of the omnidirectional antenna 150.

Using signal strength calculations, the positioning unit 160 is able to determine the location of the user devices 103 relative to the threshold. Additionally, the use of an omnidirectional antenna 150 and a directional antenna 152 enable finer granularity in the location calculations since the directional antenna 152 can be used to generate finer location information within a specific region such as a door threshold.

Figure 4:
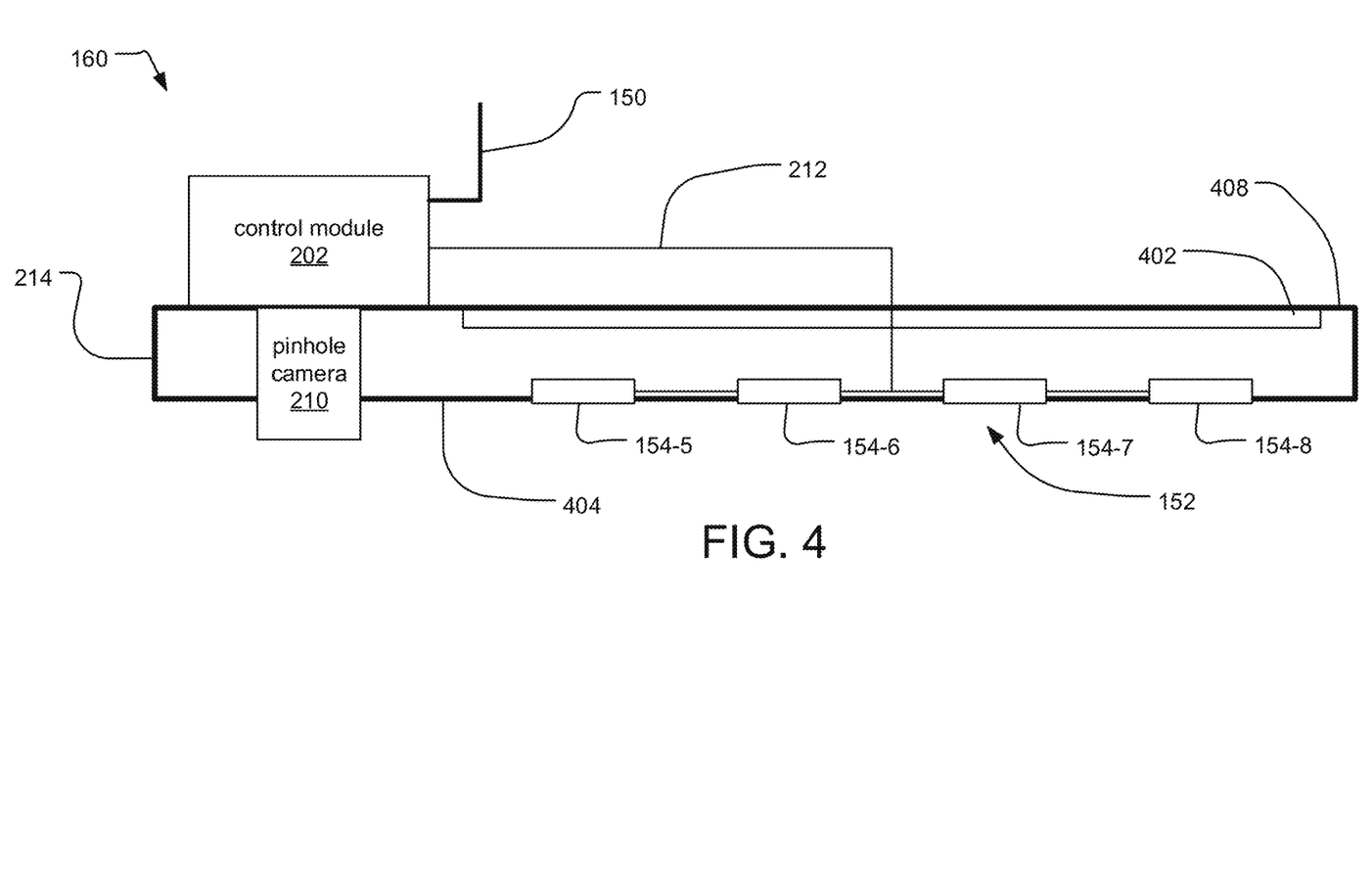
FIG. 4 is a cross sectional view of the ceiling tile positioning unit showing one possible arrangement of the control module and ceiling tile.

FIG. 4 is a cross sectional view of the ceiling tile positioning unit 160 showing one possible arrangement of the control module 202 and ceiling tile 214. The ceiling tile has a bottom exposed face 404, which is observable from the room in which the positioning unit 160 is installed, and a top unexposed face 408, which is unobservable.

In the illustrated example, the patch array antenna 152 (including the patch elements 154 and the feed line network 154) is embedded in the bottom of the substrate of the ceiling tile 214 such that the patches are slightly protruding from the surface of the exposed bottom face 404 of the ceiling tile 214. A ground plane 402 covers the top unexposed face 408 of the ceiling tile 214 above the patch array antenna 152. The control module 202 sits on top of the unexposed top face 408 of the ceiling tile 214. The pinhole camera 210 of the control module 202 is inserted through the substrate of the ceiling tile 214 such that it protrudes from the exposed bottom face 404 of the ceiling tile 214. Similarly, the patch array feed line 212 connects to the patch array antenna 152 through the unexposed top face 408 of the ceiling tile 214.

Because the top unexposed face 408 of the ceiling tile 212 is unobservable, the height of the tile can be expanded as needed.

It should be noted that, in the illustrated examples, the patch array antenna 152 protrudes from the bottom exposed face 404 of the ceiling tile 214 and thus is visible by users 104. However, in alternate embodiments, the patch array antenna 152 is concealed within the ceiling tile substrate such that it does not protrude and is not observable.

While this invention has been particularly shown and described with references to preferred embodiments thereof, it will be understood by those skilled in the art that various changes in form and details may be made therein without departing from the scope of the invention encompassed by the appended claims.

What is claimed is:

1. A positioning unit of an access control and user tracking system for a security system, the positioning unit comprising:
    an antenna for detecting wireless signals transmitted by user devices, wherein the antenna is installed in a drop ceiling system and the antenna is coupled with an antenna controller of the positioning unit via a patch array feedline and a branching feedline network connecting patch elements of the antenna to the patch array feedline, with a propagation delay in the branching feedline network being tuned to create a desired directional gain pattern of the antenna;
    a ceiling tile of the drop ceiling system, wherein the antenna is embedded in substrate of the ceiling tile, wherein the antenna that is embedded in the substrate of the ceiling tile is a directional antenna for detecting whether the user devices are present in a region in front of an access point controlled by the access control and user tracking system and the antenna is concealed within the substrate and is not observable; and
    a control module for directing a function of the positioning unit, wherein the control module is positioned on an unexposed surface of the ceiling tile and comprises the antenna controller.

2. The positioning unit as claimed in claim 1, wherein the antenna is a patch array antenna.

3. The positioning unit as claimed in claim 1, further comprising a pinhole camera for capturing video information.

4. The positioning unit as claimed in claim 3, wherein the pinhole camera is inserted through substrate of the ceiling tile and protrudes from an exposed surface of the ceiling tile.

5. The positioning unit as claimed in claim 1, further comprising a ground plane, wherein the ground plane covers an unexposed surface of the ceiling tile.

6. The positioning unit as claimed in claim 1, further comprising a control module, wherein the control module further comprises a controller, a network interface, an antenna controller, a power supply, an omni directional antenna and/or memory for the positioning unit.

7. The positioning unit as claimed in claim 6, wherein the control module is positioned on an unexposed surface of the ceiling tile.

8. The positioning unit as claimed in claim 1, wherein the positioning unit is designed into a standard ceiling tile format, and the ceiling tile with the embedded antenna is installed in place of a normal ceiling tile of the drop ceiling system.

9. An access control and user tracking system for a security system, comprising:
    positioning units for receiving packet data from user devices and generating location data for the user devices, wherein the positioning units further comprise antennas for detecting wireless signals transmitted by the user devices, wherein the antennas are installed in drop ceiling systems, and wherein the antennas are embedded in substrate of ceiling tiles of the drop ceiling systems and the antennas are coupled with an antenna controller of the positioning units via a patch array feedline and a branching feedline network connecting patch elements of the antennas to the patch array feedline, with a propagation delay in the branching feedline network being tuned to create a desired directional gain pattern of the antennas, wherein the antennas are directional antennas for detecting whether the user devices are present in a region in front of an access point controlled by the access control and user tracking system; and
    a control module for directing a function of the positioning units, wherein the control module is positioned on an unexposed surface of the ceiling tile and comprises the antenna controller.

10. The system as claimed in claim 9, wherein the antennas are patch array antennas.

11. The system as claimed in claim 9, wherein the antennas are concealed within the substrate and are not observable.

12. The system as claimed in claim 9, further comprising pinhole cameras of the positioning units for capturing video information.

13. The system as claimed in claim 12, wherein the pinhole cameras are inserted through substrate of the ceiling tiles and protrude from exposed surfaces of the ceiling tiles.

14. The system as claimed in claim 9, further comprising ground planes of the positioning units, wherein the ground planes cover unexposed surfaces of the ceiling tiles.

15. The system as claimed in claim 9, further comprising control modules of the positioning units, wherein the control modules further comprise controllers, network interfaces, antenna controllers, power supplies and/or memory for the positioning units.

16. The system as claimed in claim 15, wherein the control modules are positioned on unexposed surfaces of the ceiling tiles.

17. A positioning unit of an access control and user tracking system for a security system, the positioning unit comprising:
- an antenna for detecting wireless signals transmitted by user devices, wherein the antenna is installed in a drop ceiling system and the antenna is coupled with an antenna controller of the positioning unit via a patch array feedline and a branching feedline network connecting patch elements of the antenna to the patch array feedline, with a propagation delay in the branching feedline network being tuned to create a desired directional gain pattern of the antenna, wherein the antenna is a directional antenna for detecting whether the user devices are present in a region in front of an access point controlled by the access control and user tracking system;
- a pinhole camera for capturing video information, wherein the pinhole camera is inserted through substrate of a ceiling tile of the drop ceiling system and protrudes from an exposed surface of the ceiling tile;
- an omnidirectional antenna for tracking locations of users of the user devices; and
- a control module for directing a function of the positioning unit, wherein the control module is positioned on the unexposed surface of the ceiling tile and comprises the antenna controller and the omnidirectional antenna.

\* \* \* \* \*